United States Patent
Zhou et al.

(10) Patent No.: US 8,837,470 B1
(45) Date of Patent: Sep. 16, 2014

(54) MULTI-STAGE SWITCHING TOPOLOGY

(75) Inventors: Junlan Zhou, Sunnyvale, CA (US);
Amin Vahdat, Los Altos, CA (US);
Arjun Singh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 246 days.

(21) Appl. No.: 13/358,835

(22) Filed: Jan. 26, 2012

(51) Int. Cl.
*H04Q 11/00* (2006.01)

(52) U.S. Cl.
USPC ............................ 370/388; 370/357; 370/386

(58) Field of Classification Search
USPC ........................................................ 370/389
See application file for complete search history.

(56) References Cited

U.S. PATENT DOCUMENTS 7,586,909 B1 * 9/2009 Walrand et al. ............... 370/388
2009/0307334 A1 * 12/2009 Maltz et al. ................... 709/219

* cited by examiner

*Primary Examiner* — Yemane Mesfin
*Assistant Examiner* — Jeff Banthrongsack
(74) *Attorney, Agent, or Firm* — Lerner, David, Littenberg, Krumholz & Mentlik, LLP

(57) ABSTRACT

The present technology considers multi-stage network topologies where it is not possible to evenly stripe uplinks from a lower stage of the network topology to switching units in an upper stage of the topology. This technology proposes techniques to both improve overall throughput and to deliver uniform performance to all end hosts with uneven connectivity among the different stages while delivering uniform performance to all hosts. To achieve improved network performance in case of asymmetric connectivity, more flows may be sent to some egress ports than to others, thus weighting some ports more than others, resulting in Weighted Cost Multi Path (WCMP) flow distribution.

5 Claims, 6 Drawing Sheets

MULTI-STAGE SWITCHING TOPOLOGY

BACKGROUND OF THE INVENTION

Multi-stage networks typically have multiple paths between each source, destination pair. Hence, each switch in the network may have multiple viable egress ports (leading to multiple next-hop switches) to reach the eventual destination. Typically such next hops are treated with the same cost, i.e. traffic is distributed evenly among all the egress ports. In particular, packets grouped according to a certain set of characteristics called flows (e.g. same source/destination Internet Protocol (IP) address, source/destination transport protocol port, and protocol type) are sent along the same path. However, different flows are distributed among the multiple ports using a hash function that maps a given flow to a given egress port. When flows are distributed evenly among all viable ports, it is called Equal Cost Multi Path (ECMP) flow distribution.

SUMMARY OF THE INVENTION

One aspect of the technology provides a multi-stage network, comprising a first stage comprising a first plurality of switches, a second stage comprising a second plurality of switches, and a predetermined number of links between each of the switches in the first stage and each of the switches in the second stage. A first number of links between a first switch in the first stage and a first switch in second stage may not equal a second number of links between the first switch in the first stage and a second switch in the second stage. Accordingly, the first switch in the first stage may be adapted to distribute traffic among the first and second switches in the second stage such that the distribution of traffic is weighted in relation to at least the first number of links. The traffic may be weighted in relation to the first number of links and the second number of links. According to one aspect, the multi-stage network may further comprise a third number of links between the first switch in the second stage and a second switch in the first stage, wherein the first number of links is not equal to the third number of links, and wherein the traffic is weighted in relation to the first number of links and the third number of links. The first switch in the first stage may comprise a first plurality of data ports coupled to the first number of links and a second plurality of data ports coupled to the second number of links, and each of the first plurality of data ports and the second plurality of data ports may be assigned a weight.

Another aspect of the technology provides a method for distributing packets in a network, comprising receiving the packets at a source node, identifying a destination node for the packets, identifying at least one intermediate node between the source node and the destination node, determining a first bandwidth of a first connection between the source node the at least one intermediate node, determining a second bandwidth of a second connection between the at least one intermediate node and the destination node, and determining a percentage of the packets to transmit through the first connection based on at least the first bandwidth and the second bandwidth. The percentage of packets may utilize less than all of the first bandwidth and substantially all of the second bandwidth. The source node may be programmed to transmit the percentage of packets to the at least one intermediate node, and the percentage of the packets may be transmitted by the source node.

Yet another aspect of the technology provides a method for distributing packets in a network, comprising receiving the packets at a source node, identifying a destination node for the packets, and identifying at least two intermediate nodes between the source node and the destination node. A first bandwidth of a first connection between the source node a first intermediate node may be determined, and a second bandwidth of a second connection between the source node and a second intermediate node may also be determined. A first percentage of the packets to transmit through the first connection and a second percentage of the packets to transmit through the second connection may further be determined, such that the first intermediate node and the second intermediate node receive the packets at substantially the same rate. The source node may be programmed to distribute the packets according to the first percentage and the second percentage, and the packets may be so distributed by the source node.

DETAILED DESCRIPTION

The present technology considers multi-stage network topologies where it is not possible to evenly stripe uplinks from a lower stage of the network topology to switching units in an upper stage of the topology. Uneven striping occurs when a first stage device includes more links to one second stage device than to another. For example, the first stage device may include a limited number of uplink ports which does not evenly divide into the number of second stage devices, but it is desirable to fully utilize all of the first stage device's uplink ports. This technology proposes techniques to both improve overall throughput and to deliver uniform performance to all end hosts with uneven connectivity among the different stages. To achieve improved network performance in case of asymmetric connectivity, more flows may be sent to some egress ports than others, thus weighting some ports more than others, resulting in Weighted Cost Multi Path (WCMP) flow distribution.

Figure 1:
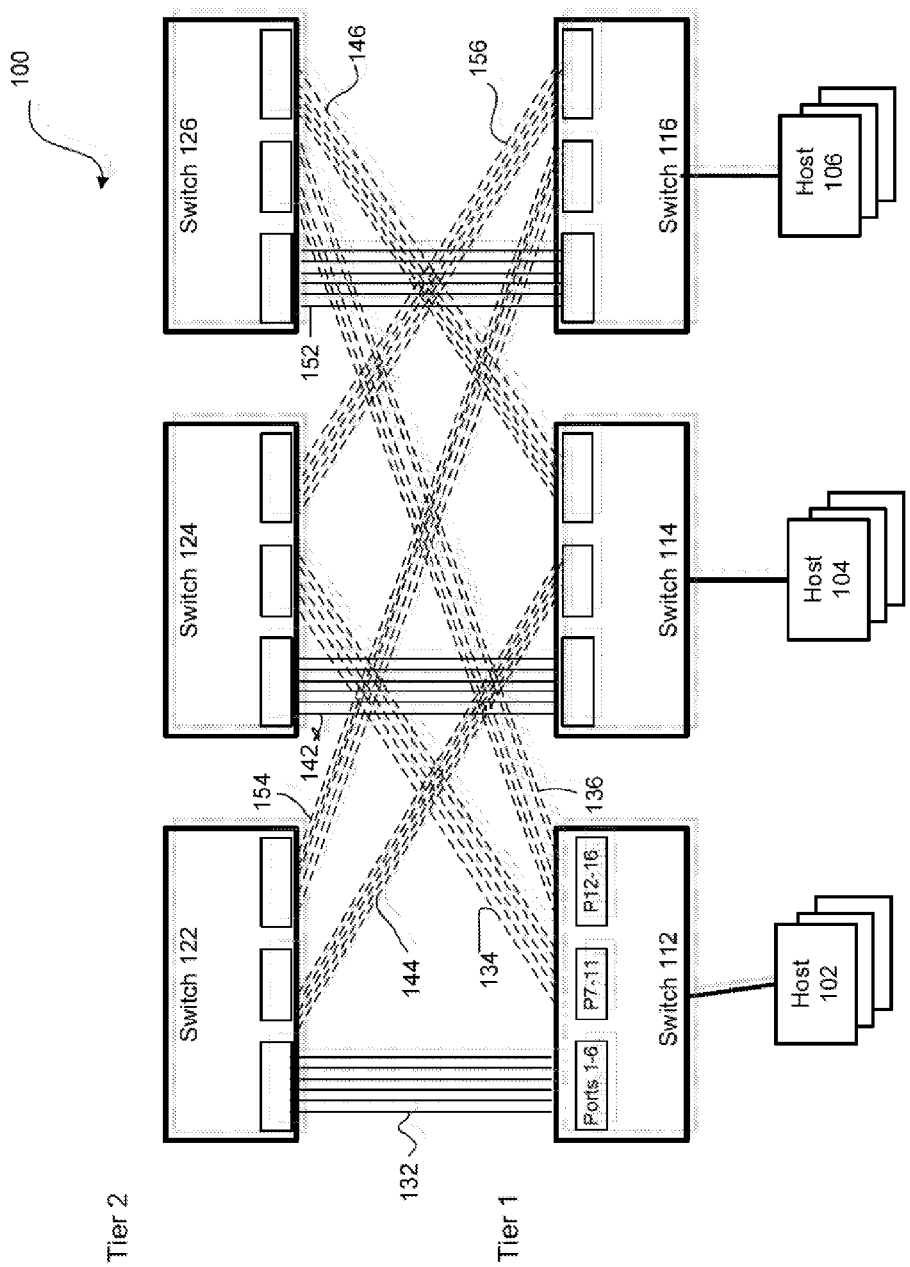
FIG. 1 is a schematic diagram of a multi-stage network according to aspects of the technology.

FIG. 1 illustrates a multi-stage network 100 according to aspects of the technology. As shown, the network comprises a first stage (Tier 1) including a first plurality of switches 112, 114, 116, and a second stage (Tier 2) including a second plurality of switches 122, 124, 126. While only a few switches 112-116, 122-126 are shown, it should be understood that the network 100 may be expanded to include any number of switches, for example, to accommodate greater amounts of network traffic. Each of the Tier 1 switches 112-116 may be coupled to one or more host devices 102, 104, 106, such as network servers or other computing devices. Each Tier 1 switch 112-116 may further be coupled to one or more of the Tier 2 switches 122-126. For example, each Tier 1 switch 112-116 may be coupled to each Tier 2 switch 122-126.

Each switch 112-116 and 122-126 may include a predetermined number of data ports. The number of data ports may vary depending on, for example, a type of switch used and may be proportional to a cost of the switch. Some ports may be dedicated to downlink traffic (e.g., from Tier 2 switches to Tier 1 switches, or from Tier 1 switches to host devices), while others may be dedicated to uplink traffic (e.g., from Tier 1 switches to Tier 2 switches, or from Tier 2 switches to other network devices). Alternatively or additionally, some ports may be dedicated to ingress while others are dedicated to egress. The number of data ports may also dictate the number of links that may be established with other network devices. For example, Tier 1 switch 112 may have 16 data ports for uplink traffic, and thus 16 links may be established between the switch 112 and the Tier 2 switches 122-126. Because there are three Tier 2 switches 122-126, and because does not divide equally by 3, there may be an uneven distribution of links among the switches 122-126 (e.g., uneven striping). For example, the connection 132 between the switch 112 and the switch 122 may comprise 6 links (e.g., coupled to ports 1-6 of the switch 112), while the connections 134, 136 between the switch 112 and each of the switches 124, 126 may comprise 5 links (e.g., coupled to ports 7-11 and ports 12-16, respectively, of the switch 112). While using ECMP flow distribution in such an environment with uneven striping may cause problems (e.g., oversubscription), weighting the flows using WCMP flow distribution may provide improved load balancing.

Figure 2:
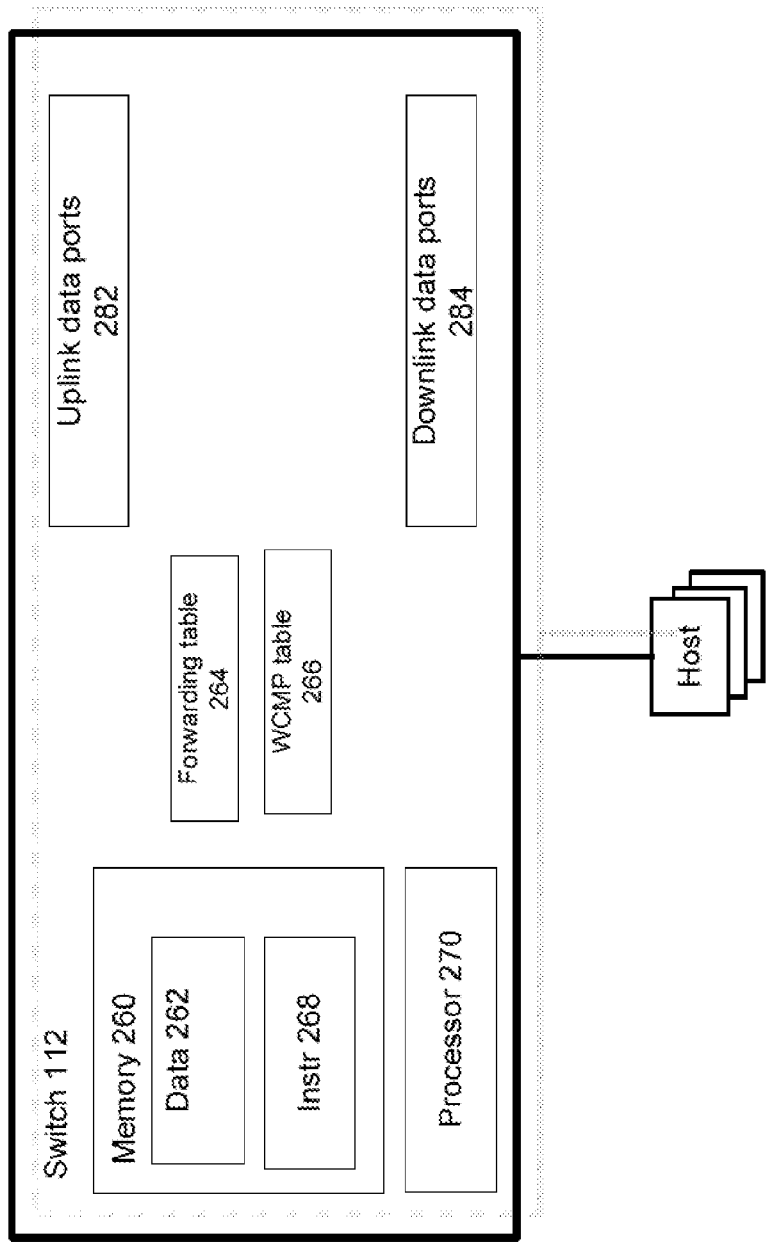
FIG. 2 is a block diagram of a switch according to aspects of the technology.

The Tier 1 switches 112-116 and the Tier 2 switches 122-126 may be routers, chips, or any other type of device capable of receiving packets at a first port and transmitting the packets through a second port. FIG. 2 illustrates an example of a switch, such as the switch 112. The switch 112 may comprise a memory 260, including data 262 and instructions 268, and a processor 270 coupled to the memory 260. The switch 112 may further comprise a number of data ports, such as uplink data ports 282 and downlink data ports 281.

The switch 112 may also include one or more forwarding tables 264 and WCMP tables 266. For example, the forwarding tables 264 may include a number of entries, each listing a key and an action. As packets are received by the switch 112, header information in those packets may be matched against the keys of the forwarding table to determine a corresponding action (e.g., a next hop). The WCMP table may, for example, include a weighting of each of the uplink data ports 282 on the switch 112, and may be used to determine which port (e.g., which uplink data port 282) the packet should be transmitted through. While the forwarding table 264 and WCMP table 266 are shown as being stored separately from the memory 260, it should be understood that the forwarding table 264, WCMP table 266, data 262, and instructions 268 may all be stored in the same medium.

The memory 260 stores information accessible by processor 270, including instructions 268, and data 262 that may be executed or otherwise used by the processor 270. The memory 260 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 268 may be any set of instructions to be executed directly (such as machine code) or indirectly (such as scripts) by the processor 270. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 262 may be retrieved, stored or modified by processor 270 in accordance with the instructions 268. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 270 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

While the components of the switch 112 have been described with respect to a particular Tier 1 switch, it should be understood that a similar architecture may be imparted to any of the other Tier 1 switches of any of the Tier 2 switches. According to one aspect, while the same switches may be used for Tier 1 and Tier 2, these switches may be configured differently. According to another aspect, the Tier 2 switches may differ from the Tier 1 switches, for example, with respect to the included number of data ports.

Figure 3:
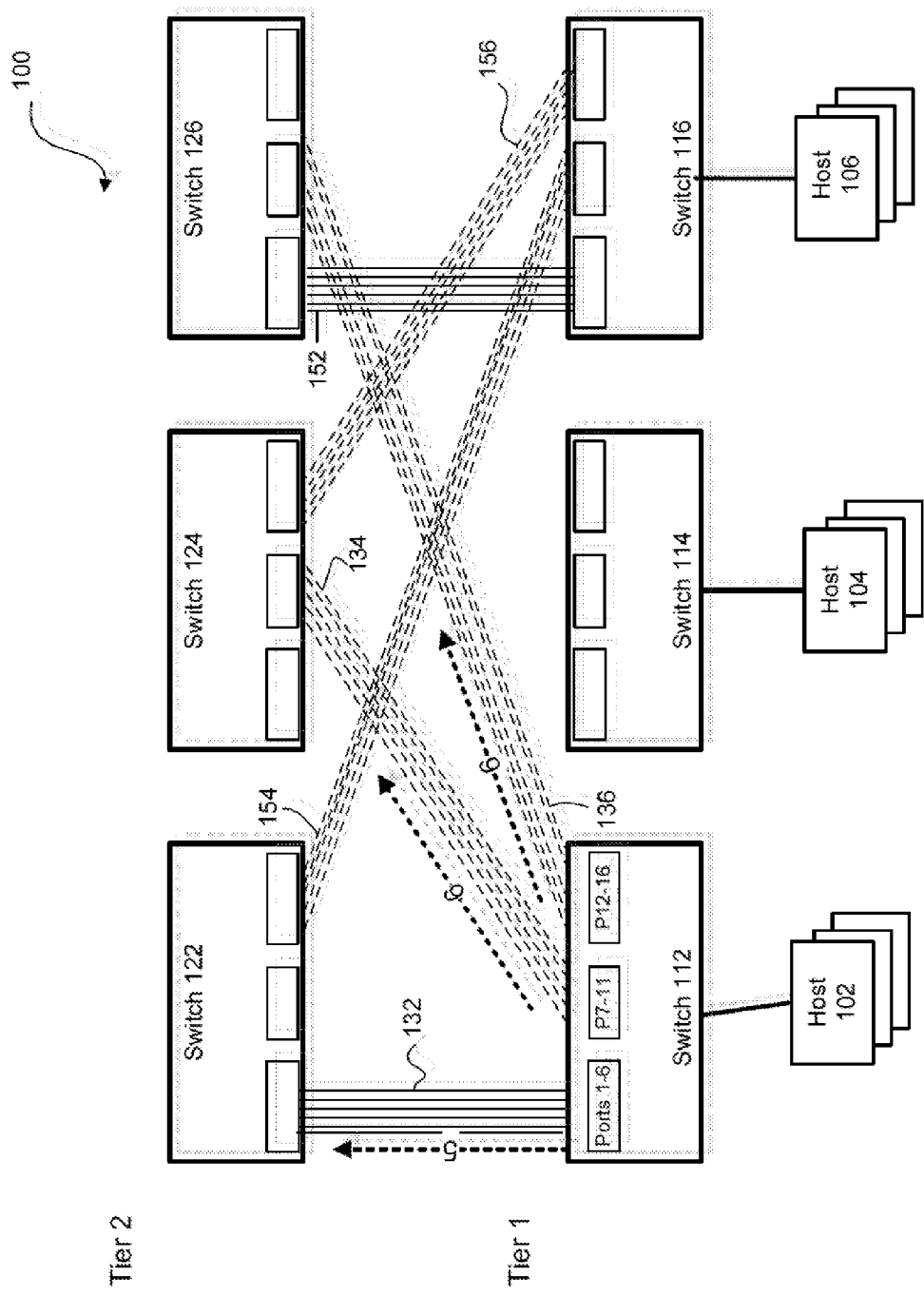
FIG. 3 is an illustration of an example of flow distribution according to aspects of the technology.

FIG. 3 illustrates an example of WCMP flow distribution according to aspects of the technology. As explained above with respect to FIG. 1, the connection 132 between the switch 112 and the switch 122 may comprise 6 links (e.g., in a bundle), while the connections 134 and 136 from the switch 112 to the switches 124 and 126, respectively, may each comprise 5 links. Similarly, the connection 152 between the switch 116 and the switch 126 may comprise 6 links, while the connections 154 and 156 to the switches 122 and 124 may each comprise 5 links. This may cause congestion in an ECMP flow distribution, because, for example, uplink traffic from the switch 112 to the switch 122 may be transmitted at a higher bandwidth than the downlink traffic from the switch 122 to the switch 116. However, using WCMP flow distribution ameliorates this problem.

As shown, the connection 132 may be given a weight of 5, while the connections 134 and 136 are each given a weight of 6. Thus, for example, for each 5 flows transmitted over each of the links in connection 132, 6 flows are transmitted over each of the links in connection 134 and 6 flows are transmitted over each of the links in connection 136. In this regard, the Tier 2 switch 122 will not become oversubscribed, and therefore is less likely to drop packets.

Figure 4:
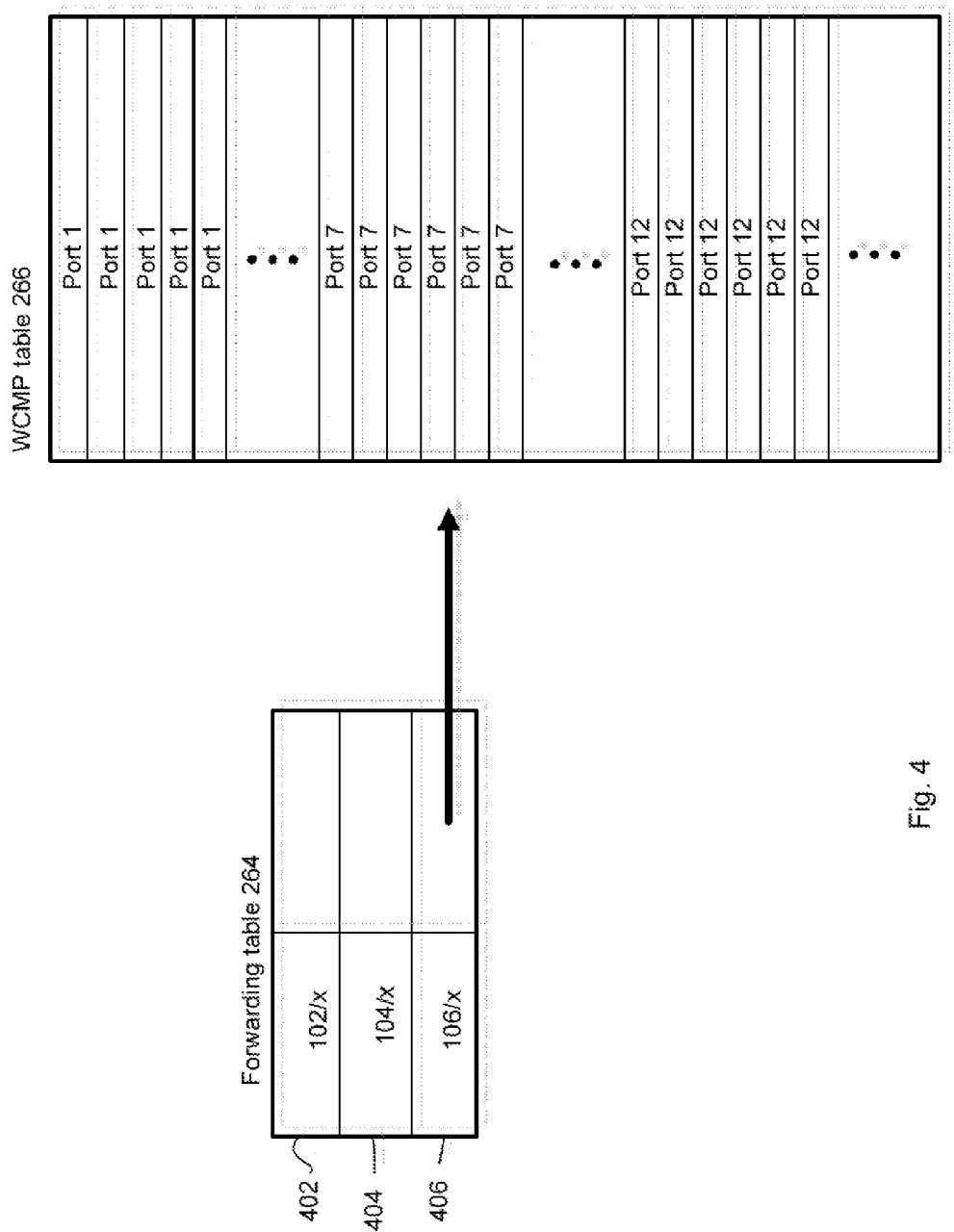
FIG. 4 is an example of switch tables according to aspects of the technology.

The weighting of the flows may be managed, for example, using the forwarding table 264 and the WCMP table 266. FIG. 4 illustrates an example of the forwarding table 264 and the WCMP table 266. The forwarding table 264 may include a number of entries 402, 404, 406, each entry having a key and an action. The key may comprise a number of bits representing, for example, a destination address. The action may comprise information representing a next hop for packets received matching the key. The WCMP table 266 may include a plurality of entries, with each entry identifying a port of the switch 112 through which received packets may be forwarded. The number of entries listing a particular port may vary depending on a weight assigned to that port. For example, the links in the connection 132 coupled to ports 1-6 of the switch 112 were assigned a weight of five, as discussed above in connection with FIG. 3. Accordingly, each of ports 1-6 may have five entries in the WCMP table 266. Similarly, the five links in the connection 134 coupled to the ports 7-11 of the switch 112 were assigned a weight of 6. Therefore, each of the ports 7-11 may have 6 corresponding entries in the WCMP table 266.

While the foregoing description of FIG. 4 provides one example in which weighting of flows is achieved, it should be understood that any hardware provided weighting scheme may alternatively or additionally be used. For example, the hardware may be able to take a weight along with each port and implement a hash algorithm such that particular ports may be picked more often than others based on their weight.

An example of WCMP distributed traffic is now described with respect to FIGS. 3-4. In this example, the host 102 serves as a source for transmitting data to the host 106, which serves as a destination. The traffic is received at the switch 112 for delivery to the switch 116 through one or more of the Tier 2 switches 122-126. Because each of the switches 122-126 are linked to both the switch 112 and the switch 116, the traffic may be distributed among the Tier 2 switches 122-126 for increased efficiency. To avoid congestion of a particular Tier 2 switch (e.g., the switch 122), the distribution may be weighted. For example, the traffic may be weighted in relation to the number of links between the switch 112 and each Tier 2 switch 122-126, and/or in relation to the number of links between a given Tier 2 switch and the switch 116. For example, each link in connection 132 may be assigned a weight of 5, while each link in connections 134 and 136 may be assigned a weight of 6. Therefore, for each 5 flows distributed through a link of the connection 132, 6 flows may be distributed through links of the connections 134, 136. In this regard, each of the switches 122-126 may be able to transmit the received portion of the traffic through the connections 152-156 to the switch 166 for delivery to the destination host 106.

The distribution may be executed by the switch 112 using, for example, a hash function. For example, the hash function may output a random number. An algorithm may correlate the random number modulo a number of ports in the switch 112 to a given port of the switch 112 or to its corresponding link. For example, if the hash function outputs a mod 0, the flow may be sent through port 1, whereas if the hash function outputs a mod 1 or mod 2, the flow may be sent through port 7. This is only one example of how a random input from a packet header may be mapped to a given port of the switch, and various other implementations may be used.

The ratios of flows distributed over each link (e.g., connections 132-136) may be determined based on, for example, throughput, the number of links between Tier 1 and Tier 2, capacity of the Tier 2 switches, capacity of the Tier 1 switch forwarding tables, etc. For example, a distribution that improves the maximum traffic throughput without any packet loss may be derived using the following equation:

$$W\_r\_s\_i = \min(N\_s\_i, N\_r\_i)/N\_s\_i,$$

In this equation, $W\_r\_s\_i$ is the weight of each link from Tier 1 switch r to Tier_2 switch i, for traffic from a source switch s to the remote Tier 1 switch r. $N\_s\_i$ is the total number of links between Tier 1 switch s to Tier 2 switch i. $N\_r\_i$ is the total number of links between Tier 1 switch r to Tier 2 switch i. For example, referring to FIG. 1, the Tier 1 switch s may be the switch 112; Tier 2 switch i may be the switch 122; Tier 1 switch r may be the switch 116. Thus, $N\_s\_i=6$, and $N\_r\_i=5$. Plugging these values into the equation, $W\_r\_s\_i=\min(6,5)/6=5/6$. Thus, 5/6 of the bandwidth of the connection between the switch 112 and the Tier 2 switch 122 may be used when transmitting flows to the remote switch 116.

According to some aspects, multiple considerations may be balanced. For example, considerations of high throughput and reduced consumption of resources in the forwarding tables may be balanced to achieve a weight distribution that satisfies both considerations.

In addition to the elements described above, methods according to aspects of the technology will now be described. While the methods may include various stages which are described below in a particular order, it should be understood that the sequence of the stages may be varied. In addition, stages may be omitted and/or additional stages may be added.

Figure 5:
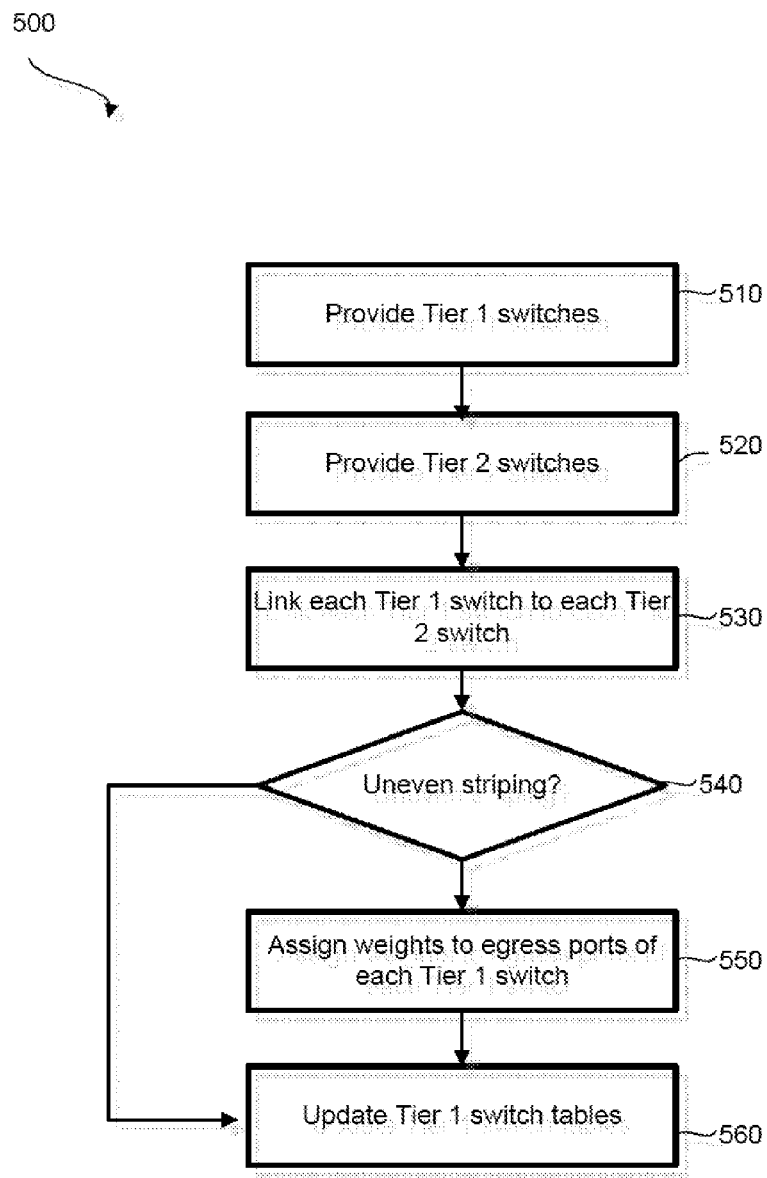
FIG. 5 is a flow diagram illustrating an example of a method for configuring a network according to aspects of the technology.

An example of a method 500 for configuring the network is illustrated in FIG. 5. This method may be used, for example, in the initial setup of a network, in expanding or upgrading a network, or in maintaining a network. For example, if a given switch in the network fails, the network may be reconfigured to accommodate the failure (e.g., by updating the forwarding tables in the switches). Moreover, the methods 500 may be used in any type of network, such as a data center switching fabric, a wide area network, a local area network, or a multicore chip.

In stage 510, a first plurality of switches are provided in a first tier. The switches may be any type of switches capable of receiving and transmitting packets. The switches may each include a number of ports, wherein some ports may be dedicated to uplink traffic and others may be dedicated to downlink traffic. According to one aspect, the ports dedicated to downlink traffic may be used to link the switches to one or more host devices.

In stage 520, a second plurality of switches are provided in a second tier. Similar to the first tier switches, the second tier switches may be any type of switch and may include a number of data ports. The second tier switches may be the same or different (e.g., different type, different capacity, different number of ports, etc.) than the first tier switches.

In stage 530, the first tier switches and the second tier switches may be linked. For example, trunks, traces, wires, or other connections may be used to link the uplink ports of the first tier switches to the downlink ports of the second tier switches. According to one aspect, each first tier switch may be linked to each second tier switch. Moreover, multiple links between each pairing of first and second tier switches may be established. For example, referring back to FIG. 1, the six links of the connection 132 may be established between the switch 112 and the switch 122, the five links of the connection 134 may be established between the switch 112 and the switch 124, and the five links of the connection 136 may be established between the switch 112 and the switch 126. According to one aspect, every uplink port of every first tier switch and every downlink of every second tier switch may be utilized (e.g., full connectivity).

In stage 540, it is determined whether a striping between the first and second tier switches is uneven (e.g., whether connectivity is asymmetric). For example, the striping may be uneven if a given first tier switch includes a first number of links to one second tier switch, and a different number of links to another second tier switch, such as in the example of FIG. 1.

If it is determined that the striping is uneven in stage 540, weights may be determined in stage 550 for flows that will be transmitted between each first tier switch and each second tier switch. For example, referring to FIG. 3, flows traversing over any link of the connection 132 may be attributed a weight of 5, while flows to be transmitted over the connections 134 and 136 may each be attributed a weight of 6. In this regard, the distribution of the flows may be balanced in relation to the bandwidth between the first and second tier switches. The weights may be determined by, for example, using a computation based on a number of links between a first Tier 1 switch and a given Tier 2 switch, and a number of links between the given Tier 2 switch and a second Tier 1 switch.

In stage 560, tables in each of the first tier switches may be updated to reflect the weights determined in stage 550. For example, as discussed with respect to FIG. 4, one or both of the router forwarding table and the WCMP table may be updated to reflect the distribution of flows among each uplink port of the switch.

Figure 6:
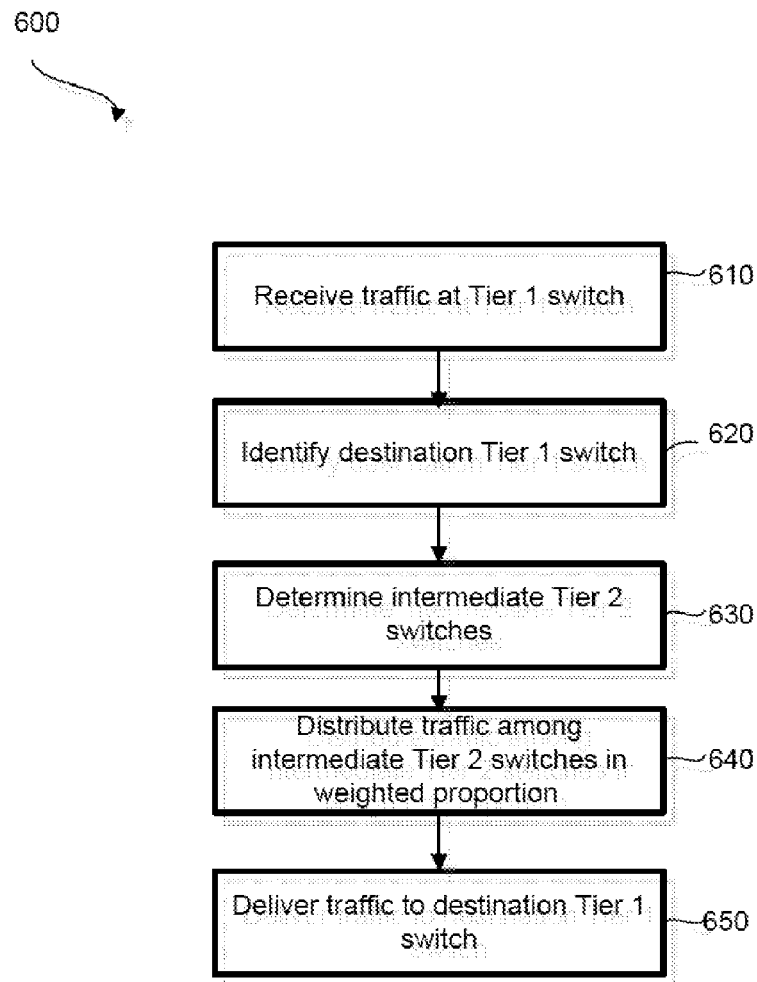
FIG. 6 is a flow diagram illustrating an example of a method for switching traffic in the network according to aspects of the technology.

An example of a method 600 for switching traffic in the network is illustrated in FIG. 6. The method 600 is described with reference to a source/destination pair of host devices, such as the host devices 102 and 106 of FIG. 3. However, it should be understood that the operations discussed in connection with the method 600 may be applied to any pairing of network devices, including switches, backplanes, etc.

In stage 610, traffic is received at a first switch in Tier 1. For example, the traffic may be received from host device 102. The traffic may comprise a number of packets destined for another host device. The packets may each include a header providing the destination information.

In stage 620, the destination for the packets may be determined, for example, using the packet header information. For example, the destination may be the host device 106.

In stage 630, the intermediate Tier 2 switches through which the packets may be routed to reach the destination host device 106 may be determined. For example, because each of the Tier 2 switches 122, 124, and 126 are linked to both the switch 112 that received the traffic and the switch 116 which is linked to the destination host device 106, each of these Tier 2 switches 122-126 may be identified. The determination of these Tier 2 switches may be made, for example, using the forwarding table and/or WCMP table of the switch 112. According to one aspect, the uplink (egress) ports of the switch 112 corresponding to these Tier 2 switches 122-126 may be identified. According to another aspect, a bandwidth between the switch 112 and each Tier 2 switch 122-126 may also be determined. For example, it may be determined that there are 6 links between the switch 112 and the switch 122, but that there are 5 links between the switch 112 and each of the switches 124, 126. Moreover, the bandwidth between each of the Tier 2 switches and the destination switch 116 may be determined.

In stage 640, the traffic may be distributed among the Tier 2 switches 122-126 in weighted proportion to the bandwidths between the Tier 1 switches 112, 116 and the Tier 2 switches 122-126. For example, because the connection between the source switch 112 and the switch 122 has a greater bandwidth (6 links) than the connection between the switch 122 and the destination switch 116 (5 links), only 5/6 of the bandwidth of each link in the connection 132 may be used to transmit the packets. In this regard, the flows may be balanced and the switch 122 is less likely to become oversubscribed. Thus, in stage 650, the packets may be delivered to the destination switch 116 with a lower chance of packets being dropped.

The above-described aspects of the technology may be advantageous in providing load balancing of multi-stage switches. By reducing a number of oversubscribed switches, fewer packets may be dropped, and transmission of traffic comprising a plurality of packets may be completed faster. Additionally, these techniques may be applied by reconfiguring existing network equipment, and thus may be implemented without substantial cost.

While the examples above are described with respect to a two-stage network having three switches in each stage, it should be understood that the technology may be applied to a network having any number of switches in Tier 1 and Tier 2. Moreover, the technology may also be applied to expanded networks comprising additional stages (e.g., above, below, or in between Tier 1 and Tier 2).

Although the present invention has been described with reference to particular embodiments, it should be understood that these examples are merely illustrative of the principles and applications of the present invention. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments. However, these and that other arrangements may be devised without departing from the spirit and scope of the present invention as defined by the appended claims.

The invention claimed is:

1. A multi-stage network, comprising:
a first stage comprising a first plurality of switches;
a second stage comprising a second plurality of switches;
a predetermined number of links between each of the switches in the first stage and each of the switches in the second stage, wherein a first number of links between a first switch in the first stage and a first switch in second stage is not equal to: (i) a second number of links between the first switch in the first stage and a second switch in the second stage, or (ii) a third number of links between a second switch in the first stage and the first switch in the second stage;
wherein the first switch in the first stage comprises a first plurality of data ports coupled to the first number of links and a second plurality of data ports coupled to the second number of links;
and each of the first plurality of data ports and the second plurality of data ports is assigned a weight such that
the first switch in the first stage is adapted to distribute traffic among the first and second switches in weighted proportion to at least the first number of links; and
wherein the weight assigned to the first plurality of data ports is a ratio of the lesser of the first number of links and the third number of links, over the first number of links.

2. The multi-stage network of claim 1, wherein the first switch in the first stage comprises a forwarding table, wherein the forwarding table dictates the distribution of traffic.

3. The multi-stage network of claim 2, wherein the forwarding table comprises a number of entries, wherein the number of entries corresponds to a sum of the weights assigned to the first plurality of data ports and the second plurality of data ports.

4. The multi-stage network of claim 1, wherein the weights are assigned as a function of throughput.

5. The multi-stage network of claim 4, wherein the throughput exceeds a predetermined threshold.

* * * * *